US012691794B2

(12) United States Patent (10) Patent No.: US 12,691,794 B2
Jonsson (45) Date of Patent: Jul. 28, 2026

(54) VEHICLE SEAT RAIL SEALING SYSTEM, VEHICLE COMPRISING A VEHICLE SEAT RAIL SEALING SYSTEM, AND METHOD FOR OPERATING A VEHICLE SEAT RAIL SEALING SYSTEM

(71) Applicants:Ningbo Geely Automobile Research & Development Co., Ltd., Ningbo (CN); Zhejiang Geely Holding Group Co., Ltd., Zhejiang (CN)

(72) Inventor: Tony Jonsson, Alings+522 s (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 129 days.

(21) Appl. No.: 18/885,720

(22) Filed: Sep. 15, 2024

(65) Prior Publication Data

US 2025/0001910 A1     Jan. 2, 2025

Related U.S. Application Data

(63) Continuation of application No. PCT/CN2023/081389, filed on Mar. 14, 2023.

(30) Foreign Application Priority Data

Mar. 30, 2022   (EP) ..................................... 22165352

(51) Int. Cl.
*B60N 2/07*      (2006.01)

(52) U.S. Cl.
CPC .................................. *B60N 2/0725* (2013.01)

(58) Field of Classification Search
CPC .................................................... B60N 2/0725
See application file for complete search history.

(56) References Cited

U.S. PATENT DOCUMENTS

| | | | |
|---|---|---|---|
| 6,145,911 A | 11/2000 | Sturt et al. | |
| 10,807,503 B2 * | 10/2020 | Tuffs | B60N 2/0715 |
| 10,829,007 B2 * | 11/2020 | Kapusky | B60N 2/0732 |

(Continued)

FOREIGN PATENT DOCUMENTS

| | | |
|---|---|---|
| DE | 102009056414 A1 | 6/2011 |
| DE | 102012108982 A1 | 3/2014 |

(Continued)

*Primary Examiner* — William L Miller
(74) *Attorney, Agent, or Firm* — Tucker Ellis LLP

(57) ABSTRACT

A vehicle seat rail sealing system includes a cover structure connected to an upper side of an elongated seat rail having an extension in a longitudinal direction. The cover structure has first cover elements connected to each other in the longitudinal direction and second cover elements connected to each other in the longitudinal direction. The first and second cover elements are pairwise arranged on opposite lateral sides of the seat rail. The first cover elements, at an outer lateral side, pivot around a first axis in the longitudinal direction, and the second cover elements, at an outer lateral side, pivot around a second axis extending in the longitudinal direction. An inner lateral side of the first cover elements are releasably connectable to an inner lateral side of the corresponding second cover elements above the seat rail.

16 Claims, 6 Drawing Sheets

(56)     References Cited

U.S. PATENT DOCUMENTS

| | | | |
|---|---|---|---|
| 10,882,567 B2 | 1/2021 | Schulz et al. | |
| 11,267,369 B2 * | 3/2022 | Yamada | B60N 2/072 |
| 12,420,680 B2 * | 9/2025 | Sezgin | B60N 2/0725 |
| 2014/0265463 A1 * | 9/2014 | Phinney | B60N 2/0725 |
| | | | 297/182 |
| 2019/0308670 A1 * | 10/2019 | Schulz | B60N 2/01516 |
| 2020/0276918 A1 * | 9/2020 | Kapusky | B60N 2/0732 |
| 2020/0282869 A1 | 9/2020 | Tuffs | |

FOREIGN PATENT DOCUMENTS

| | | | | | |
|---|---|---|---|---|---|
| EP | 4253140 | A1 * | 10/2023 | | B60N 2/0725 |
| JP | 2016150599 | A * | 8/2016 | | |
| JP | 2016150704 | A * | 8/2016 | | B60N 2/0725 |
| KR | 102260814 | B1 | 6/2021 | | |
| WO | 2014102900 | A1 | 7/2014 | | |

* cited by examiner

VEHICLE SEAT RAIL SEALING SYSTEM, VEHICLE COMPRISING A VEHICLE SEAT RAIL SEALING SYSTEM, AND METHOD FOR OPERATING A VEHICLE SEAT RAIL SEALING SYSTEM

RELATED APPLICATION DATA

This application is a continuation of International Patent Application No. PCT/CN2023/081389, filed Mar. 14, 2023, and claims the benefit of European Patent Application No. 22165352.0, filed Mar. 30, 2022, the disclosures of which are incorporated herein by reference in their entireties.

TECHNICAL FIELD

The present disclosure relates to a vehicle seat rail sealing system comprising a cover structure arranged in connection to an upper side of a seat rail. The disclosure further relates to a vehicle comprising a vehicle seat rail sealing system and a method for operating a vehicle seat rail sealing system.

BACKGROUND

Vehicle seats are commonly arranged with a seat rail system for a mechanical sliding connection between the vehicle seat and a floor structure of the vehicle. Conventional seat rail systems comprise a pair of two interconnected rails that are linearly slidable relative to each other, where a lower seat rail is stationary attached to the floor structure and an upper rail structure is fastened to the vehicle seat. With the seat rail systems, the vehicle seat is adjustable in a longitudinal vehicle direction for a convenient positioning of the vehicle seat. The lower seat rail is often arranged as an open rail structure that is exposed to feet of vehicle occupants, and is easily collecting dirt, dust, liquids, and debris, which may affect the operation of the vehicle seat. Further, the collection of dirt, dust, liquids and debris is unpleasant to the occupants of the vehicle and is difficult to remove from the seat rail when cleaning the vehicle interior. Rubber lips or similar sealing arrangements may be used for preventing that dirt, dust, liquids and debris is collected in the seat rail. However, rubber lips are typically not completely closed and they support loads badly. Further, there is a risk that they will deform in an open position if the seat remains in the same position for a long time, especially in hot climate conditions.

There is thus a need for an improved scaling arrangement to prevent dirt, dust, liquids and debris from being collected in the seat rail, where the sealing arrangement is supporting loads in a desired way.

SUMMARY

An object of the present disclosure is to provide a vehicle seat rail scaling system, a vehicle comprising a vehicle seat rail scaling system, and a method for operating a vehicle seat rail scaling system, where the previously mentioned problems are avoided. This object is at least partly achieved by the features of the independent claims. The dependent claims contain further developments of the vehicle seat rail sealing system and the method for operating a vehicle seat rail sealing system.

The disclosure concerns a vehicle seat rail sealing system comprising a cover structure arranged in connection to an upper side of a seat rail. The seat rail is having an elongated configuration with an extension in a longitudinal direction.

The cover structure comprises a plurality of first cover elements arranged in connection to each other in the longitudinal direction and a plurality of second cover elements arranged in connection to each other in the longitudinal direction. The first cover elements and corresponding second cover elements are pairwise arranged on opposite lateral sides of the seat rail and configured for cooperating with each other. The first cover elements are via an outer lateral side configured for pivoting around a first pivoting axis extending in the longitudinal direction and arranged on a first lateral side of the seat rail, and the second cover elements are via an outer lateral side configured for pivoting around a second pivoting axis extending in the longitudinal direction and arranged on a second lateral side of the seat rail. An inner lateral side of the first cover elements are releasably connectable to an inner lateral side of the corresponding second cover elements, wherein the inner lateral sides are positioned above the seat rail. In an open position, the inner lateral side of the first cover elements are disconnected from the inner lateral side of the corresponding second cover elements. In a closed position, the inner lateral side of the first cover elements are connected to the inner lateral side of the corresponding second cover elements in an over-centre position.

Advantages with these features are that the cover elements are providing an efficient structure for supporting loads, which structure further is enabling a scaling arrangement that is preventing dirt, dust, liquids and debris from being collected in the seat rail. The cover elements are in the over-centre position forced into an engaged stable and locked position in the closed position. The cover elements are configured for going over-centre through snap action or a flip-over functionality when displaced from the open position to the closed position, and the locking engagement of the cover elements are in this way maintained in the over-centre position until forced from the closed position to the open position.

According to an embodiment, the system further comprises a movably arranged upper rail structure configured for being slidingly connected to the seat rail. Upon movement of the upper rail structure along the seat rail in the longitudinal direction the upper rail structure is configured for displacing the first cover elements and the second cover elements between the open position and the closed position. By the movement of the upper rail structure in the longitudinal direction, the cover elements are displaced between the open and closed positions through interaction from the upper rail structure. The upper rail structure is configured for exerting an opening force or closing force upon the cover elements. When being displaced in the longitudinal direction, the upper rail structure is pushing the cover elements forwards of the upper rail structure in the direction of movement to the open position, and the rearwards cover elements in the direction of movement are pushed into the closed position.

According to an embodiment, the upper rail structure is configured for arranging the first cover elements and the second cover elements corresponding to a longitudinal position of the upper rail structure in the open position through interaction by a front end or a rear end of the upper rail structure. In this way, the cover elements that are in an overlapping relationship to the upper rail structure in the longitudinal direction are in the open position to give access to the seat rail.

According to an embodiment, the first cover elements and the second cover elements are configured for pivoting in a direction away from the seat rail, upon displacement from the closed position to the open position. The first cover elements and the second cover elements are configured for pivoting in a direction towards the seat rail, upon displacement from the open position to the closed position. By the pivoting movement away from the seat rail, the upper rail structure has access to the seat rail when the cover elements are in the open position. The cover elements arranged above the seat rail corresponding to a section of the seat rail not occupied by the upper rail structure are in the closed position, preventing access to the seat rail.

According to an embodiment, in the closed position the first cover elements are configured for cooperating with the corresponding second cover elements in an overlapping relationship in the lateral direction. The overlapping relationship is providing a secure and stable position of the cover elements in the closed position, with ability to support loads.

According to an embodiment, the first cover elements comprises a first groove and a first protruding element. The second cover elements comprises a second groove and a second protruding element. In the overlapping relationship in the lateral direction, the first protruding element is in engagement with the second groove and the second protruding element is in engagement with the first groove. The engagement between the protruding elements and the grooves are establishing a locking function in the over-centre position for a secure and efficient engagement between the first cover elements and the second cover elements with high stability.

According to an embodiment, the first cover elements comprises a third protruding element and the second cover elements comprises a third groove. In the overlapping relationship in the lateral direction, the third protruding element is in engagement with the third groove. In this way, a firm connection between the cover elements is established, which is increasing the stability and ability to support loads.

According to an embodiment, one or more of the first cover elements and/or the second cover elements are arranged with a downwards inclining surface comprising an evacuation hole. The downwards inclining surface with evacuation holes are enabling transport of liquids away from the cover elements in an efficient way.

According to an embodiment, the system further comprises a first flexible element arranged in connection to an outer side of the first cover elements and a second flexible element arranged in connection to an outer side of the second cover elements. The first flexible element is extending in the longitudinal direction above the first cover elements for forming a first outer cover structure, and the second flexible element is extending in the longitudinal direction above the second cover elements for forming a second outer cover structure. A longitudinal opening is provided between the first flexible element and the second flexible element. The flexible elements are providing a tight seal that is preventing dirt, dust, liquids and debris from being collected in the seat rail. The flexible elements are supported by the cover elements for a stable construction with ability to support loads in an efficient way. The supporting function by the cover elements are preventing that the flexible elements will deform over time, especially in hot climate conditions. The flexible elements are simple to clean and maintain for a pleasant experience for the occupants of the vehicle.

According to an embodiment, the first flexible element is extending in the lateral direction from the first lateral side towards the second lateral side, and the second flexible element is extending in the lateral direction from the second lateral side towards the first lateral side.

According to an embodiment, the first flexible element and the second flexible element are arranged in a non-overlapping relationship in the lateral direction.

The disclosure further concerns a vehicle comprising a vehicle seat rail scaling system as described above.

The disclosure further concerns a method for operating a vehicle seat rail scaling system comprising a cover structure arranged in connection to an upper side of a seat rail, where the seat rail is having an elongated configuration with an extension in a longitudinal direction. The cover structure comprises a plurality of first cover elements arranged in connection to each other in the longitudinal direction and a plurality of second cover elements arranged in connection to each other in the longitudinal direction. The first cover elements and corresponding second cover elements are pairwise arranged on opposite lateral sides of the seat rail and configured for cooperating with each other. The first cover elements are via an outer lateral side arranged to pivot around a first pivoting axis extending in the longitudinal direction and arranged on a first lateral side of the seat rail, and the second cover elements are via an outer lateral side arranged to pivot around a second pivoting axis extending in the longitudinal direction and arranged on a second lateral side of the seat rail. An inner lateral side of the first cover elements are releasably connectable to an inner lateral side of the corresponding second cover elements, and the inner lateral sides are positioned above the seat rail. The method comprises the steps: disconnecting the inner lateral side of the first cover elements from the inner lateral side of the corresponding second cover elements in an open position; and connecting the inner lateral side of the first cover elements to the inner lateral side of the corresponding second cover elements in an over-centre position in a closed position.

Advantages with these features are that the cover elements are providing an efficient structure for supporting loads, which structure further is enabling a sealing arrangement that is preventing dirt, dust, liquids and debris from being collected in the seat rail. The cover elements are easily displaced between the open and closed positions for an efficient operation. The cover elements are configured for going over-centre through snap action or a flip-over functionality when displaced from the open position to the closed position, and the locking engagement of the cover elements are in this way maintained in the over-centre position until forced from the closed position to the open position. In the over-centre position, the cover elements are through the snap action or a flip-over functionality forced into an engaged stable and locked position in the closed position.

According to an embodiment, the system further comprises a movably arranged upper rail structure configured for being slidingly connected to the seat rail. The method further comprises the step: displacing the first cover elements and the second cover elements between the open position and the closed position by the upper rail structure upon movement of the upper rail structure along the seat rail in the longitudinal direction. Through the movement of the upper rail structure in the longitudinal direction, the cover elements are displaced between the open and closed positions through interaction from the upper rail structure. The upper rail structure is configured for exerting an opening force or closing force upon the cover elements. When being displaced in the longitudinal direction, the upper rail structure is exerting an opening force onto the cover elements forwards of the upper rail structure in the direction of movement, and a closing force onto the rearwards cover elements in the direction of movement.

According to an embodiment, the method further comprises the steps: pivoting the first cover elements and the second cover elements in a direction away from the seat rail upon displacement from the closed position to the open position; and pivoting the first cover elements and the second cover elements in a direction towards the seat rail upon displacement from the open position to the closed position. By the pivoting movement away from the seat rail, the upper rail structure has access to the seat rail when the cover elements are in the open position. The cover elements arranged above the seat rail corresponding to a section of the seat rail not occupied by the upper rail structure are in the closed position, preventing access to the seat rail.

According to an embodiment, the system further comprises a first flexible element arranged in connection to an outer side of the first cover elements and a second flexible element arranged in connection to an outer side of the second cover elements. The first flexible element is extending in the longitudinal direction above the first cover elements for forming a first outer cover structure, and the second flexible element is extending in the longitudinal direction above the second cover elements for forming a second outer cover structure. A longitudinal opening is provided between the first flexible element and the second flexible element. The method further comprises the step: displacing the first flexible element and the second flexible element upon interaction from the first cover elements and the second cover elements when displaced between the open position and the closed position. The flexible elements are providing a tight seal that is preventing dirt, dust, liquids and debris from being collected in the seat rail. The flexible elements are supported by the cover elements for a stable construction with ability to support loads in an efficient way. The supporting function by the cover elements are preventing that the flexible elements will deform over time, especially in hot climate conditions. The flexible elements are further simple to clean and maintain for a pleasant experience for the occupants of the vehicle.

BRIEF DESCRIPTION OF THE DRAWINGS

The disclosure will be described in detail in the following, with reference to the attached drawings, in which.

DETAILED DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
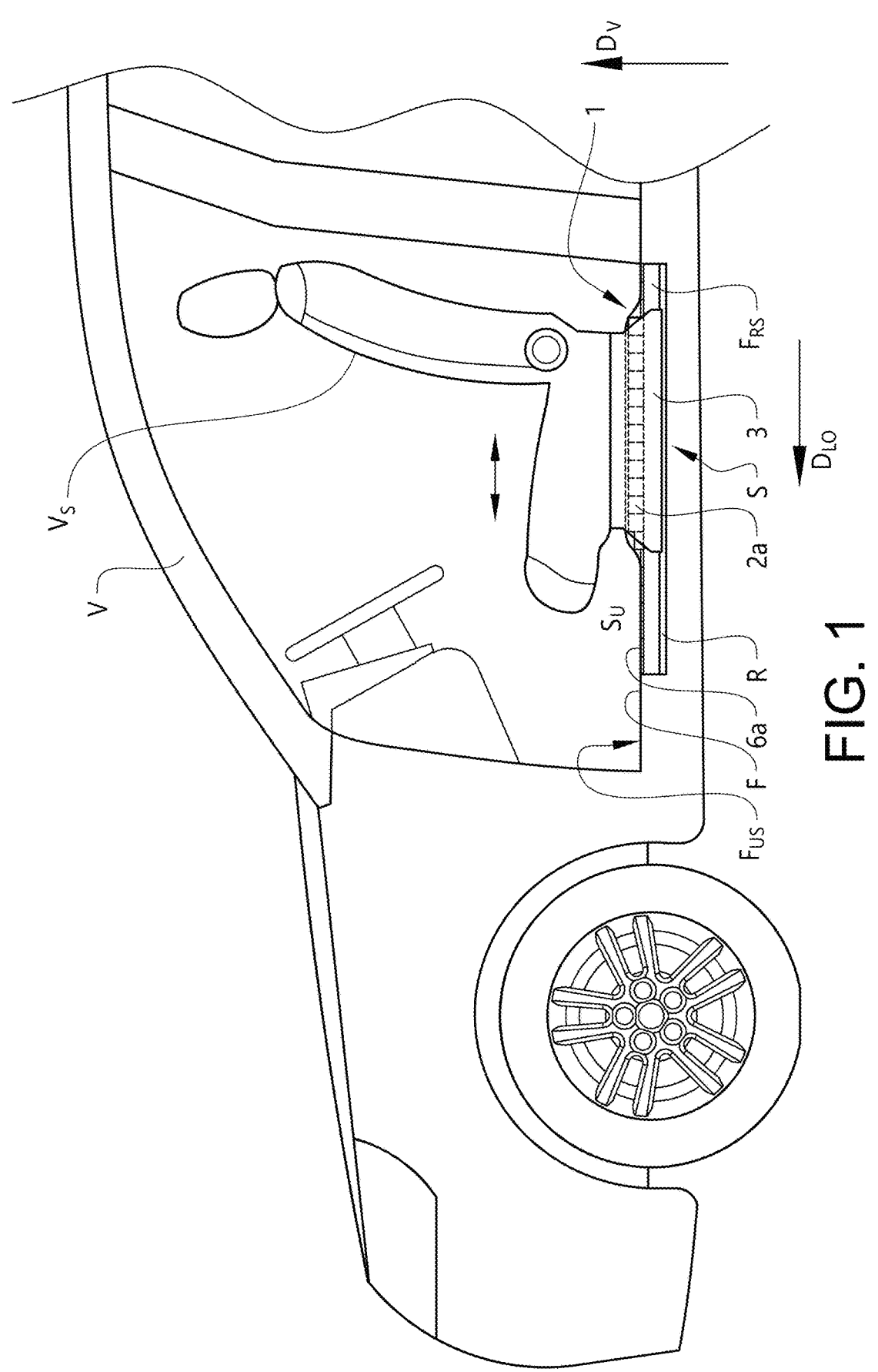
FIG. 1 shows schematically, a side view of a vehicle with a vehicle seat rail sealing system, according to the disclosure.

FIG. 1 schematically shows a vehicle V with a vehicle seat rail sealing system S. The vehicle seat rail sealing system S comprises a cover structure 1 arranged in connection to an upper side $S_U$ of a seat rail R. The vehicle seat rail sealing system S is efficiently preventing dirt, dust, liquids and debris from being collected in the seat rail R. The seat rail R is arranged as a stationary lower rail structure of a seat rail system and a movably arranged upper rail structure 3 is slidingly connected to the seat rail R. The seat rail R is attached to a floor structure F of the vehicle V, and the upper rail structure 3 is attached to a vehicle seat $V_S$. In the illustrated embodiment, the seat rail R is integrated into the floor structure F and attached to a recessed section $F_{RS}$ of the floor structure F, as understood from FIG. 1. By attaching the seat rail R to the floor structure F, a secure attachment of the seat rail R to the vehicle V is accomplished. Non-illustrated additional fastening brackets or similar arrangements may for example be used for the attachment of the seat rail R to the recessed section $F_{RS}$ of the floor structure F, where screw fasteners or similar fastening devices can be used for a firm and secure attachment of the seat rail R to the floor structure F via the fastening brackets. The vehicle seat $V_S$ is attached to the upper rail structure 3 with suitable fastening means. The cover structure 1 is configured to support loads, such as load from feet of an occupant of the vehicle or a bag arranged on the floor structure F.

The seat rail R has an elongated configuration and is extending in a longitudinal direction $D_{LO}$ of the vehicle V, as shown in the figures, or in an essentially longitudinal direction of the vehicle V. The upper rail structure 3 is movably arranged relative to the seat rail R in the longitudinal direction $D_{LO}$ of the vehicle V, as indicated with the double arrow in FIG. 1, for a convenient adjustment and positioning of the vehicle seat $V_S$ relative to the floor structure F. The seat rail system may be provided with suitable non-illustrated positioning and locking arrangements for positioning of the upper rail structure 3 relative to the seat rail R when adjusting the vehicle seat 4 in the longitudinal direction $D_{LO}$. Usually, two parallel seat rail systems are used for holding one vehicle seat, and thus two vehicle seat rail sealing systems S are arranged in connection to one vehicle seat $V_S$. In FIG. 1, the seat rail system is illustrated in connection to a front vehicle seat, but may be used also for other adjustable vehicle seats.

Figures 2, 3:
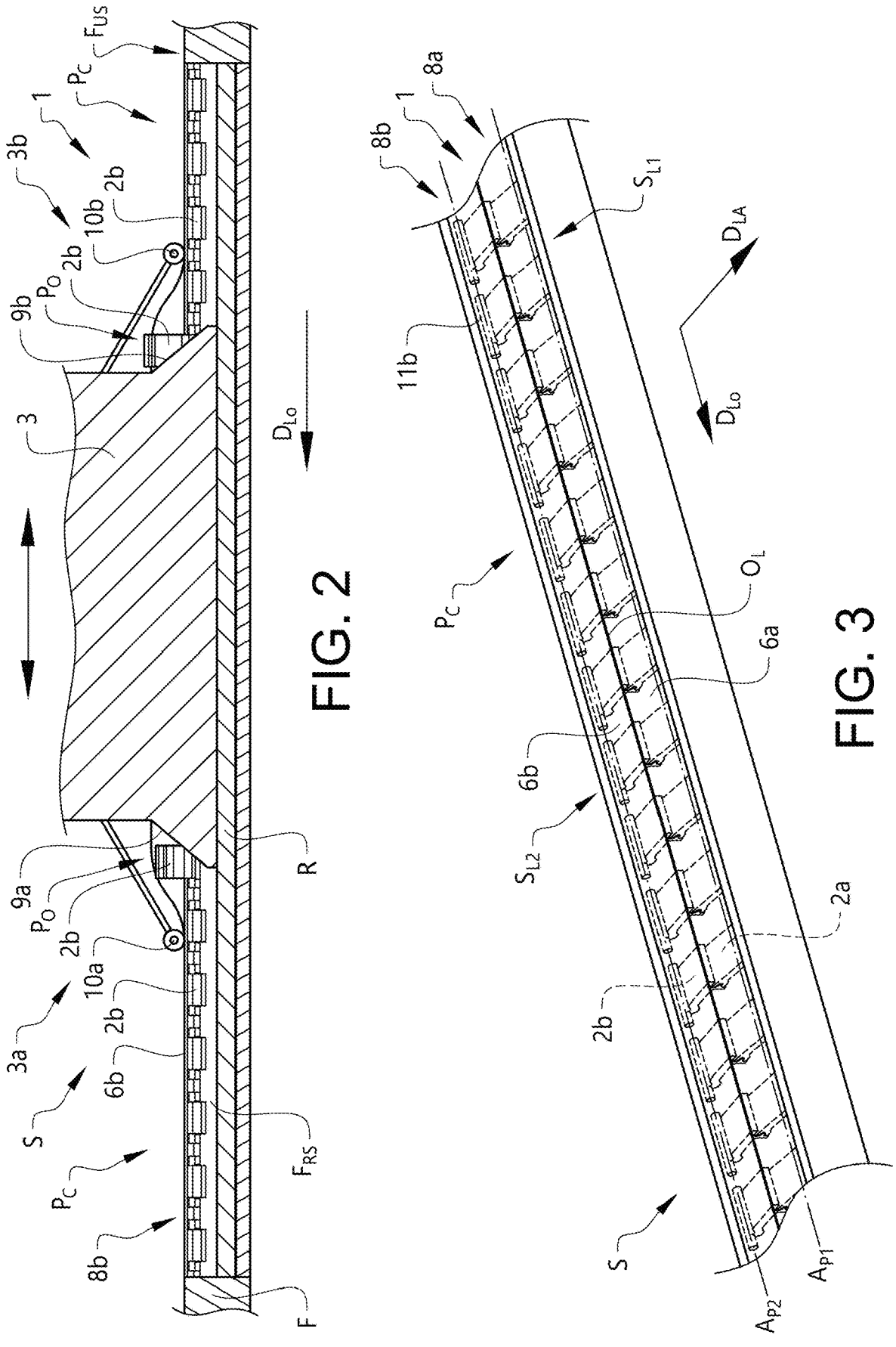
FIG. 2 shows schematically, a cross-sectional side view of a section of the vehicle seat rail sealing system, according to the disclosure.
FIG. 3 shows schematically, a perspective view from above of a section of the vehicle seat rail sealing system, according to the disclosure.

A lateral direction $D_{LA}$ is defined as a direction of the vehicle V perpendicular to the longitudinal direction $D_{LO}$, as shown in for example FIG. 3. The expressions upper, lower, upwards, and downwards, used in this context are referring to relative positions in a vertical direction $D_V$ of the vehicle V, with reference to the seat rail R when installed in the vehicle V in the position illustrated in FIG. 1.

As described above and illustrated in for example FIG. 1, the seat rail R has an elongated configuration with an extension in the longitudinal direction $D_{LO}$. The upper rail structure 3 may be provided with rollers, bearings or other suitable means for enabling a sliding movement along the seat rail R with low friction. In the illustrated embodiment, the seat rail R is integrated in the floor structure F and arranged in the recessed section $F_{RS}$ in connection to and below an upper surface $F_{US}$ of the floor structure F. By the configuration with the seat rail R integrated in the floor structure F and below the upper surface $F_{US}$, the vehicle seat rail sealing system S with the cover structure 1 can be arranged above the seat rail R on the same level, or essentially on the same level, as the upper surface F$_{US}$ of the floor structure F for a flush configuration of the floor structure F and the vehicle seat rail sealing system S.

The cover structure 1 comprises a plurality of first cover elements 2a arranged in connection to each other in the longitudinal direction D$_{LO}$ and a plurality of second cover elements 2b arranged in connection to each other in the longitudinal direction D$_{LO}$, as shown in for example FIGS. 3, 4A-4B, 5A-5C and 6. The first cover elements 2a and corresponding second cover elements 2b are arranged above the seat rail R, and pairwise arranged on opposite lateral sides of the seat rail R. In this way, a first cover element 2a and a corresponding second cover element 2b are forming a pair of cover elements that is configured for covering a part of a space above the seat rail R in connection to the upper surface F$_{US}$ of the floor structure F. The first cover elements 2a and corresponding second cover elements 2b are configured for cooperating with each other between an open position P$_O$ and a closed position P$_C$, as will be further described below.

Figures 5A, 5B:
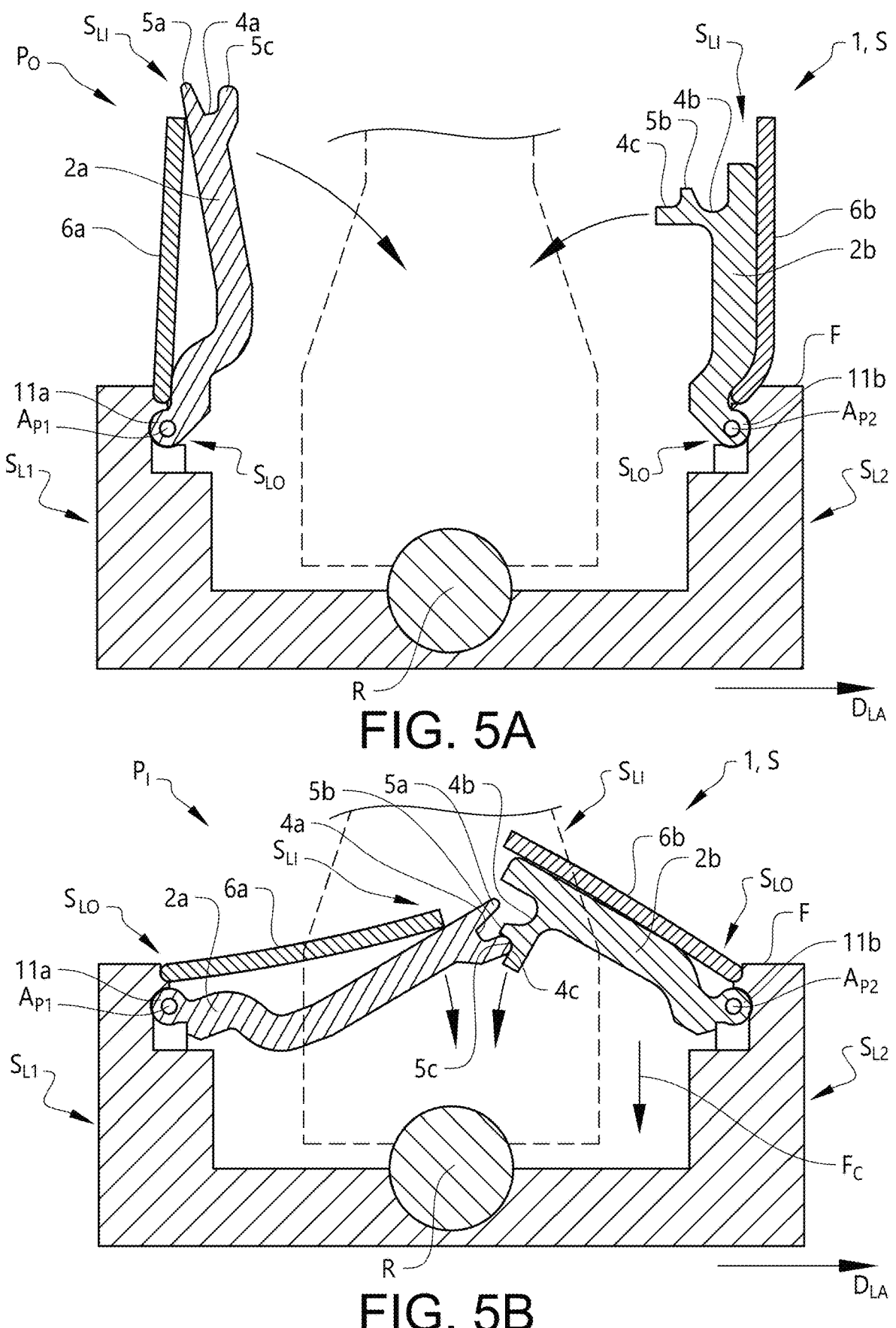
FIGS. 5A-5C show schematically, cross-sectional views of the vehicle seat rail sealing system in an open position, in an intermediate position, and in a closed position, according to the disclosure.
Figure 5C:
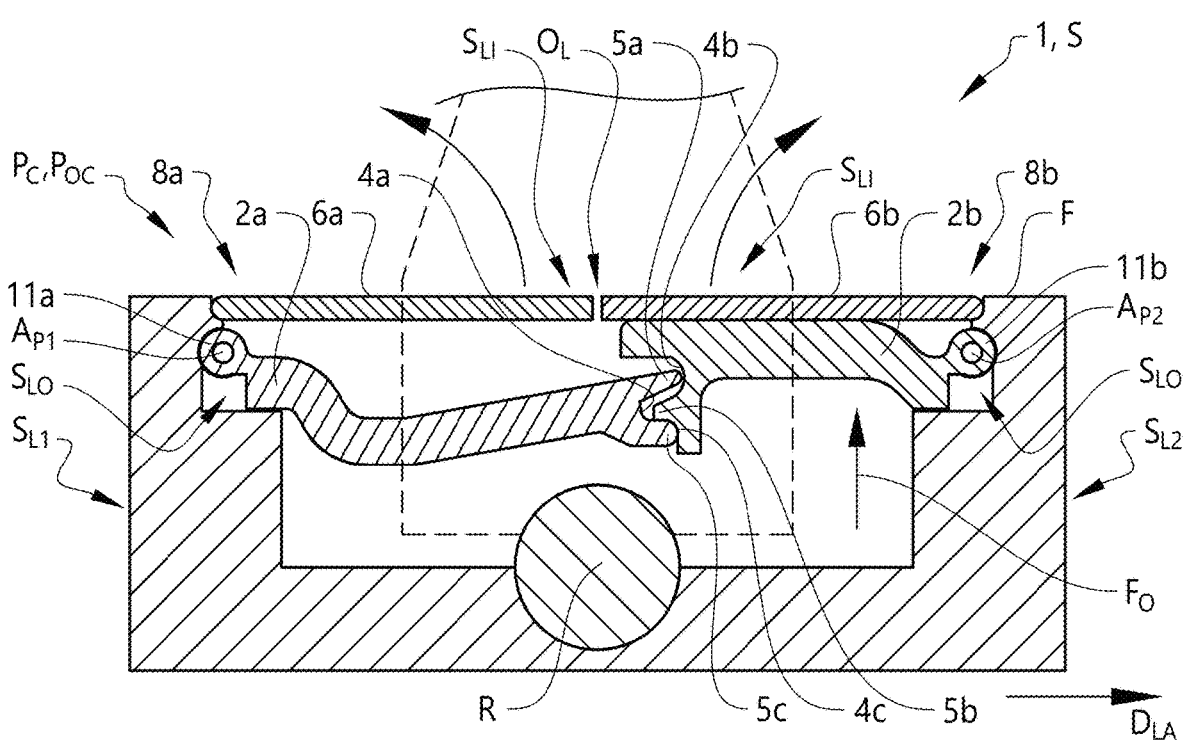

Each of the first cover elements 2a comprises an outer lateral side S$_{LO}$. The first cover elements 2a are pivoting around a first pivoting axis A$_{P1}$ via the outer lateral sides S$_{LO}$ of the first cover elements 2a. The first pivoting axis A$_{P1}$ is extending in the longitudinal direction D$_{LO}$ and arranged on a first lateral side S$_{L1}$ of the seat rail R, as shown in FIGS. 3 and 5A-5C. Each of the second cover elements 2b comprises an outer lateral side S$_{LO}$. The second cover elements 2b are pivoting around a second pivoting axis A$_{P2}$ via the outer lateral sides S$_{LO}$ of the second cover elements 2b. The second pivoting axis A$_{P2}$ is extending in the longitudinal direction D$_{LO}$ and arranged on a second lateral side S$_{L2}$ of the seat rail R, as shown in FIGS. 3 and 5A-5C. Upon displacement from the closed position P$_C$ to the open position P$_C$, the first cover elements 2a and the second cover elements 2b are pivoting in a direction away from the seat rail R. Upon displacement from the open position P$_O$ to the closed position P$_C$, the first cover elements 2a and the second cover elements 2b are pivoting in a direction towards the seat rail R. To enable the pivoting movement, the first cover elements 2a are hingedly connected to the floor structure F at the first pivoting axis A$_{P1}$, and the second cover elements 2b are hingedly connected to the floor structure F at the second pivoting axis A$_{P2}$. The first cover elements 2a may be connected to the floor structure F via first shaft structures 11a at the first pivoting axis A$_{P1}$, as shown in FIGS. 5A-5C. The second cover elements 2b may be connected to the floor structure F via second shaft structures 11b at the second pivoting axis A$_{P2}$, as shown in FIGS. 5A-5C. It should be understood that other suitable hinge structures could also be used.

Figure 6:
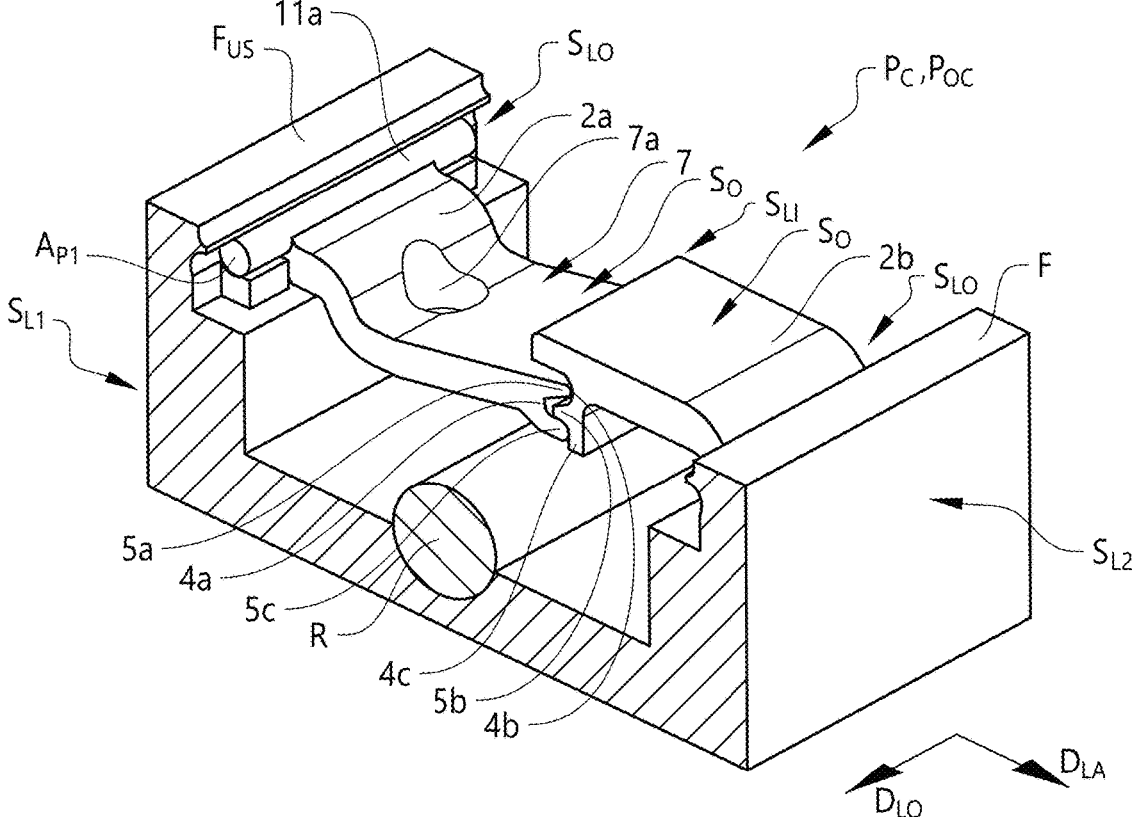
FIG. 6 shows schematically, a perspective view from above of a section of the vehicle seat rail sealing system in the closed position.

As further illustrated in for example FIGS. 5A-5C and 6, an inner lateral side S$_{LI}$ of each first cover element 2a is releasably connectable to an inner lateral side S$_{LI}$ of a corresponding second cover element 2b. The inner lateral sides S$_{LI}$ of the first cover elements 2a and second cover elements 2b respectively are extending in the longitudinal direction D$_{LO}$. The inner lateral sides S$_{LI}$ of the respective first cover elements 2a and second cover elements 2b are positioned above the seat rail R. In this way, the inner lateral sides are aligned with, or essentially aligned with, the extension of the seat rail R in the longitudinal direction D$_{LO}$. In the closed position P$_C$, access to the seat rail R section below the cover elements is prevented, and in the open position P$_O$, access for the upper rail structure 3 to a section of the seat rail R below the cover elements is enabled. In the open position P$_O$, the inner lateral sides S$_{LI}$ of the first cover elements 2a are disconnected from the inner lateral sides S$_{LI}$ of the corresponding second cover elements 2b, as shown in FIG. 5A. In the closed position P$_C$, the inner lateral sides S$_{LI}$ of the first cover elements 2a are connected to the inner lateral sides S$_{LI}$ of the corresponding second cover elements 2b, as shown in FIGS. 5C and 6.

The inner lateral sides S$_{LI}$ of the first cover elements 2a are connected to the inner lateral sides S$_{LI}$ of the corresponding second cover elements 2b in an over-centre position P$_{OC}$ in the closed position P$_C$ for a high stability. In the closed position P$_C$, the first cover elements 2a are configured for cooperating with the corresponding second cover elements 2b in an overlapping relationship in the lateral direction D$_{LA}$. The overlapping relationship is establishing a locking interaction between the first cover elements 2a and the corresponding second cover elements 2b. The over-centre position is for example shown in FIGS. 5C and 6.

With the expression over-centre position P$_{OC}$ is meant that the cover elements in the closed position P$_C$ are forced into an engaged stable and locked position, where they are going over-centre through snap action or a flip-over functionality when displaced from the open position P$_O$ to the closed position P$_C$. The locking engagement of the cover elements are in this way maintained in the over-centre position P$_{OC}$ until forced from the closed position P$_C$ to the open position P$_O$.

In FIG. 5A, the inner lateral side S$_{LI}$ of the first cover element 2a is disconnected from the inner lateral side S$_{LI}$ of the corresponding second cover element 2b, and the pair of cover elements are thus arranged in the open position P$_O$. To displace the cover elements of the illustrated embodiment from the closed position P$_C$, shown in FIG. 5C, into the open position P$_O$, the first cover element 2a is pivoted around the first pivoting axis A$_{P1}$ via the outer lateral side S$_{LO}$ of the first cover element 2a in a counterclockwise direction, and the second cover element 2b is pivoted around the second pivoting axis A$_{P2}$ via the outer lateral side S$_{LO}$ of the second cover element 2b in a clockwise direction, as indicated with arrows in FIG. 5C. It should be understood that the references to clockwise and counterclockwise directions are referring to the position of the seat rail sealing system S illustrated in FIGS. 5A-5C.

To displace the first cover element 2a and the second cover element 2b from the open position P$_O$ to the closed position P$_C$, the cover elements are pivoted towards each other. In this way, the first cover element 2a is pivoted around the first pivoting axis A$_{P1}$ via the outer lateral side S$_{LO}$ of the first cover element 2a in a clockwise direction, and the second cover element 2b is pivoted around the second pivoting axis A$_{P2}$ via the outer lateral side S$_{LO}$ of the second cover element 2b in a counterclockwise direction, as indicated with arrows in FIG. 5A. When the inner lateral side S$_{LI}$ of the first cover element 2a meets the inner lateral side S$_{LI}$ of the corresponding second cover element 2b, the cover elements are arranged in an intermediate position P$_I$, as shown in FIG. 5B. In the intermediate position P$_I$, the inner lateral sides of the respective cover element may rest against each other until a closing force F$_C$, is pushing the first cover element 2a and the second cover element 2b downwards in rotational movements around the outer lateral sides from the intermediate position P$_I$ to the closed position P$_C$. When resting against each other in the intermediate position P$_I$, the cover elements may be considered arranged in a stable position until the closing force F$_C$ is displacing them into the closed position P$_C$ where the cover elements are snapped into locking engagement in the stable over-centre position $P_{OC}$. With the two stable positions, the cover elements may be considered forming a bi-stable system, where they are forced into the over-centre position $P_{OC}$ when displaced from the intermediate position $P_I$ to the closed position $P_C$. It should however be understood that the over-centre position $P_{OC}$ is locking the first cover element $2a$ and the second cover element $2b$ towards each other. The references to clockwise and counterclockwise directions are referring to the position of the seat rail sealing system S illustrated in FIGS. 5A-5C.

To displace the first cover element $2a$ and the second cover element $2b$ from the closed position $P_C$ to the open position $P_O$, the cover elements are pushed in a direction upwards with an opening force $F_O$. Through the opening force $F_O$, the first cover element $2a$ and the second cover element $2b$ are pivoted away from each other. In this way, the first cover element $2a$ is pivoted around the first pivoting axis $A_{P1}$ via the outer lateral side $S_{LO}$ of the first cover element $2a$ in the counterclockwise direction, and the second cover element $2b$ is pivoted around the second pivoting axis $A_{P1}$ via the outer lateral side $S_{LO}$ of the second cover element $2b$ in the clockwise direction, from the over-centre position $P_{OC}$ in the closed position $P_C$ shown in FIG. 5C, to the intermediate position $P_I$ shown in FIG. 5B. In the intermediate position $P_I$, the inner lateral sides of the respective cover element may rest against each other until further pushed upwards, where first cover element $2a$ and the second cover element $2b$ are displaced in rotational movements around the outer lateral sides from the intermediate position $P_I$ to the open position $P_O$.

The cover elements are suitably made from a relatively stiff flexible material, such as for example plastic materials or composite materials, allowing them to be slightly deformed when being forced into the over-centre position $P_{OC}$ by the closing force $F_C$, and when being forced away from the over-centre position $P_{OC}$ by the opening force $F_O$.

As described above, the movably arranged upper rail structure 3 is configured for being slidingly connected to the rail R and the sliding connection is enabling the vehicle seat $V_S$ to be adjustable in the longitudinal direction $D_{LO}$ for a convenient positioning of the vehicle seat $V_S$. Upon movement of the upper rail structure 3 along the seat rail R in the longitudinal direction $D_{LO}$ the upper rail structure 3 is displacing the first cover elements $2a$ and the second cover elements $2b$ between the open position $P_O$ and the closed position $P_C$, via the intermediate position $P_I$.

Figure 4A:
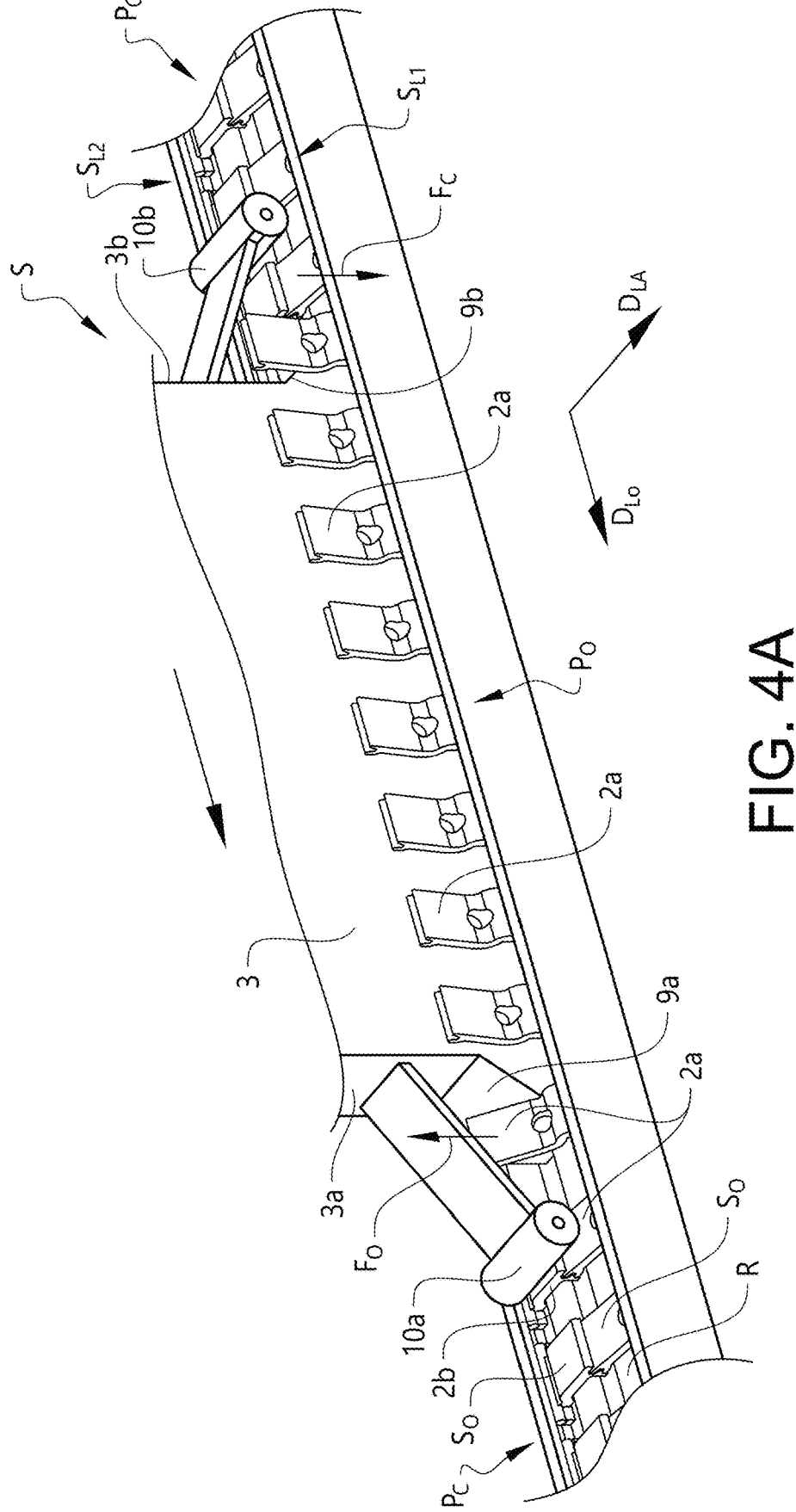
FIGS. 4A-4B show schematically, perspective views from above of a section of the vehicle seat rail sealing system and an upper rail structure, according to the disclosure.
Figure 4B:
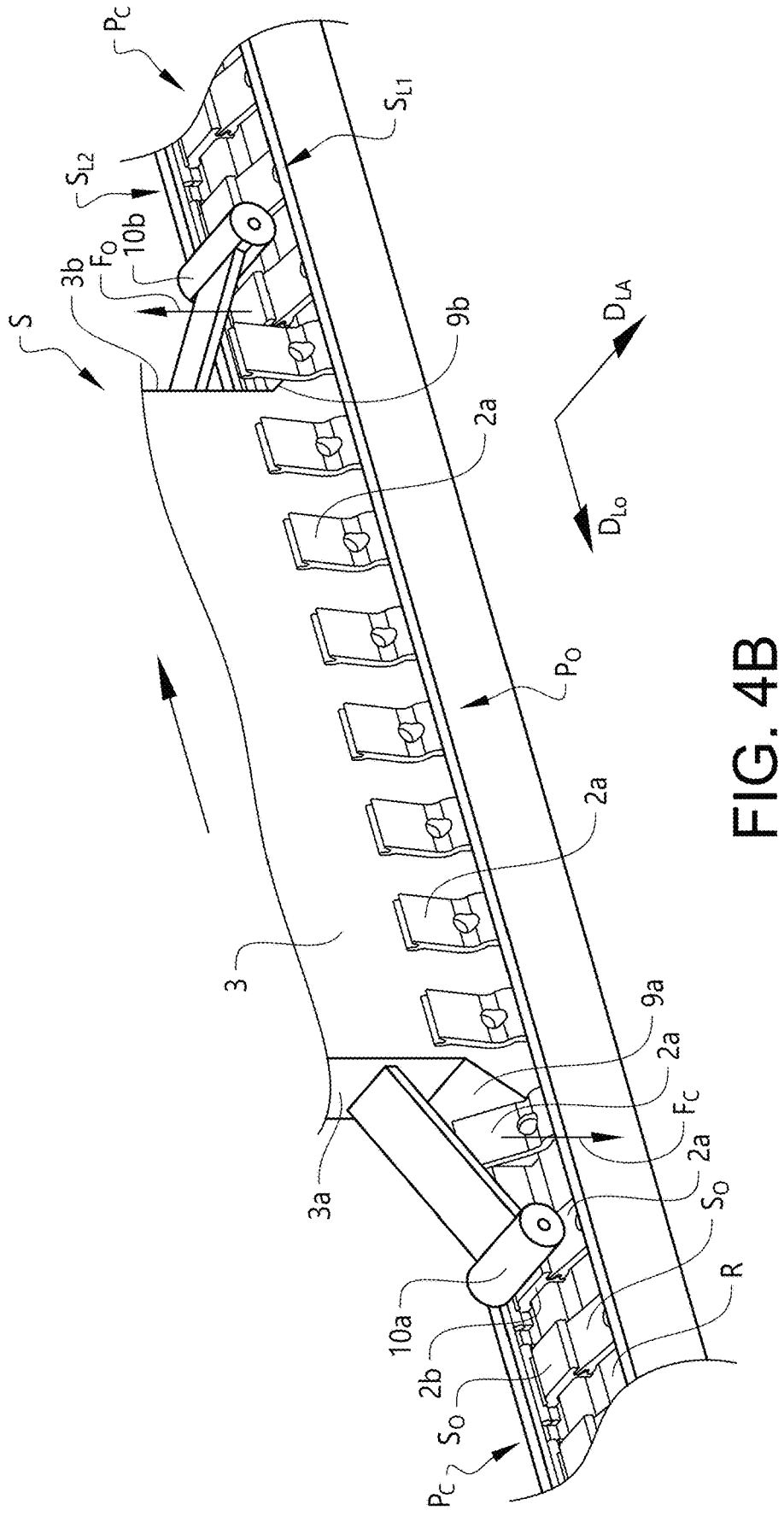

The upper rail structure 3 is constructed to exert the opening force $F_O$ when displacing the first cover elements $2a$ and the second cover elements $2b$ from the closed position $P_C$ to the open position $P_O$. A front end $3a$ of the upper rail structure 3 is provided with a first inclined surface $9a$, and a rear end $3b$ of the upper rail structure 3 is provided with a second inclined surface $9b$, as shown in FIGS. 2 and 4A-4B. The first inclined surface $9a$ and the second inclined surface $9b$ respectively are configured for exerting the opening force $F_O$ onto the cover elements.

The upper rail structure 3 is thus upon movement configured for arranging the first cover elements $2a$ and the second cover elements $2b$ corresponding to a longitudinal position of the upper rail structure 3 in the open position $P_O$ through interaction by the front end $3a$ or the rear end $3b$ of the upper rail structure 3 via the inclined surfaces. As shown in FIGS. 4A-4B, the cover elements arranged in a longitudinally overlapping relationship to the upper rail structure 3 are arranged in the open position $P_O$, and the cover elements arranged forwards of and rearwards of the upper rail structure 3 are arranged in the closed position $P_C$. With this arrangement, only a required number of cover elements are in the open position $P_O$.

When the upper rail structure 3 is moved forwards along the rail structure R in the longitudinal direction $D_{LO}$, as shown in FIG. 4A, the first inclined surface $9a$ is pushing the first cover elements $2a$ and the second cover elements $2b$ in a direction upwards. This upwards pushing action by the first inclined surface $9a$ is exerting the opening force $F_O$ onto the first cover elements $2a$ and the second cover elements $2b$. During the movement of the upper rail structure 3 forwards relative to the seat rail R, a required number of pairs of cover elements in front of the upper rail structure 3 are displaced to the open position $P_O$ when positioning the vehicle seat $V_S$ forwards in the longitudinal direction $D_{LO}$, as understood from FIG. 4A.

When the upper rail structure 3 is moved rearwards along the rail structure R in the longitudinal direction $D_{LO}$, as shown in FIG. 4B, the second inclined surface $9b$ is pushing the first cover elements $2a$ and the second cover elements $2b$ in a direction upwards. This upwards pushing action by the second inclined surface $9b$ is exerting the opening force $F_O$ onto the first cover elements $2a$ and the second cover elements $2b$. During the movement of the upper rail structure 3 rearwards relative to the seat rail R, a required number of pairs of cover elements in front of the upper rail structure 3 are displaced to the open position $P_O$ when positioning the vehicle seat $V_S$ rearwards in the longitudinal direction $D_{LO}$, as understood from FIG. 4B.

The upper rail structure 3 is further constructed to exert the closing force $F_C$ when displacing the first cover elements $2a$ and the second cover elements $2b$ from the open position $P_O$ to the closed position $P_C$. The front end $3a$ of the upper rail structure 3 is provided with a first closing element $10a$, and the rear end $3b$ of the upper rail structure 3 is provided with a second closing element $10b$, as shown in FIGS. 2 and 4A-4B. The first closing element $10a$ and the second closing element $10b$ respectively are configured for exerting the closing force $F_C$ onto the cover elements. The closing elements may be arranged as a roller structure as shown in FIGS. 2 and 4A-4B, where one or more rollers are pushing the cover elements downwards from the open position $P_O$ to the closed position $P_C$ through rolling action. In an alternative non-illustrated embodiment, the pushing elements may instead be arranged as stationary surfaces that are pushing the cover elements downwards from the open position $P_O$ to the closed position $P_C$ through sliding action.

The upper rail structure 3 is upon movement configured for arranging the first cover elements $2a$ and the second cover elements $2b$ into the closed position $P_C$ through interaction by the first closing element $10a$ at the front end $3a$ or the second closing element $10b$ at the rear end $3b$.

When the upper rail structure 3 is moved forwards along the rail structure R in the longitudinal direction $D_{LO}$, as shown in FIG. 4A, the second closing element $10b$ is pushing the first cover elements $2a$ and the second cover elements $2b$ in a direction downwards. This downwards pushing action by the second closing element $10b$ is exerting the closing force $F_C$ onto the first cover elements $2a$ and the second cover elements $2b$. During the movement of the upper rail structure 3 forwards relative to the seat rail R, a required number of pairs of trailing cover elements behind the upper rail structure 3 are displaced to the closed position $P_C$ when positioning the vehicle seat $V_S$ forwards in the longitudinal direction $D_{LO}$, as understood from FIG. 4A.

When the upper rail structure 3 is moved rearwards along the rail structure R in the longitudinal direction $D_{LO}$, as shown in FIG. 4B, the first closing element 10*a* is pushing the first cover elements 2*a* and the second cover elements 2*b* in a direction downwards. This downwards pushing action by the first closing element 10*a* is exerting the closing force $F_C$ onto the first cover elements 2*a* and the second cover elements 2*b*. During the movement of the upper rail structure 3 rearwards relative to the seat rail R, a required number of pairs of trailing cover elements behind the upper rail structure 3 are displaced to the closed position $P_C$ when positioning the vehicle seat $V_S$ rearwards in the longitudinal direction $D_{LO}$, as understood from FIG. 4B.

One or more of the first cover elements 2*a* and/or the second cover elements 2*b* may be arranged with a downwards inclining surface 7 comprising an evacuation hole 7*a*. As shown in the embodiment illustrated in FIG. 6, the first cover elements 2*a* are arranged with the downwards inclining surface 7. One or more of the downwards inclining surface 7 comprises an evacuation hole 7*a*. The downwards inclining surfaces 7 are allowing liquids to be transported and drained through the evacuation holes 7*a*. The recessed section $F_{RS}$ of the floor structure F may be provided with draining structures for further transport of liquids away from the seat rail R.

In the illustrated embodiment shown in FIGS. 5A-5C and 6, the first cover elements 2*a* comprises a first groove 4*a* and a first protruding element 5*a*. The second cover elements 2*b* comprises a second groove 4*b* and a second protruding element 5*b*. In the closed position $P_C$, where the first cover elements 2*a* and the second cover elements 2*b* are arranged in the overlapping relationship in the lateral direction $D_{LA}$, the first protruding element 5*a* is in engagement with the second groove 4*b* and the second protruding element 5*b* is in engagement with the first groove 4*a*. The engagement between the protruding elements and the grooves are establishing the locking function in the over-centre position $P_{OC}$ for a secure and efficient engagement between the first cover elements 2*a* and the second cover elements 2*b* with high stability. Further, in the illustrated embodiment, the first cover elements 2*a* comprises a third protruding element 5*c* and the second cover elements 2*b* comprises a third groove 4*c*, and in the overlapping relationship in the lateral direction $D_{LA}$, the third protruding element 5*c* is in engagement with the third groove 4*c*. With this configuration, a firm connection between the cover elements is established.

The vehicle seat rail sealing system S further comprises a first flexible element 6*a* arranged in connection to an outer side $S_O$ of the first cover elements 2*a* and a second flexible element 6*b* arranged in connection to an outer side $S_O$ of the second cover elements 2*b*, as shown in for example FIGS. 5A-5C. The first flexible element 6*a* and the second flexible element 6*b* are forming part of the cover structure 1 as an upper visible layer arranged above the first and second cover elements. The first cover elements 2*a* and the second cover elements 2*b* are functioning as a lower support layer for the flexible elements. Each of the first flexible element 6*a* and second flexible element 6*b* is having an elongated shape with an extension in the longitudinal direction $D_{LO}$ along the length of the seat rail R, where the first flexible element 6*a* and the second flexible element 6*b* are arranged on opposite lateral sides of the seat rail R, as understood from FIG. 3. In the illustrated embodiment, each flexible element is arranged as a single elongated strip of a suitable flexible material. With this configuration, the first flexible element 6*a* is extending in the longitudinal direction $D_{LO}$ above the first cover elements 2*a* for forming a first outer cover structure 8*a*, and the second flexible element 6*b* is extending in the longitudinal direction $D_{LO}$ above the second cover elements 2*b* for forming a second outer cover structure 8*b*.

An outer lateral side $S_{LO}$ of the first flexible element 6*a* is connected to the floor structure F in connection to the first pivoting axis $A_{P1}$, and the second flexible element is connected to the floor structure F in connection to the second pivoting axis $A_{P2}$, as shown in FIGS. 5A-5C. An inner lateral side $S_{LI}$ of the first flexible element 6*a* is arranged as a free end that is allowed to flex upon displacement of the first cover structures 2*a*. An inner lateral side $S_{LI}$ of the second flexible element 6*b* is arranged as a free end that is allowed to flex upon displacement of the second cover structures 2*b*. A longitudinal opening $O_L$, is provided between the inner lateral side $S_{LI}$ of the first flexible element 6*a* and the inner lateral side $S_{LI}$ of the second flexible element 6*b*. The longitudinal opening $O_L$ between the first flexible element 6*a* and the second flexible element 6*b* is enabling displacement of the upper rail structure 3 in the longitudinal direction $D_{LO}$.

Upon displacement of the upper rail structure 3 in the longitudinal direction $D_{LO}$, the first flexible element 6*a* and the second flexible element 6*b* are deflecting in a direction upwards when the cover structures below are displaced from the closed position $P_C$ to the open position $P_O$ through interaction from the upper rail structure 3. The sections of the first flexible element 6*a* and the second flexible element 6*b* arranged forwards of and rearwards of the upper rail structure 3 are suitably arranged flush with the floor structure F in a flat position, as understood from FIG. 2. Thus, the first flexible element 6*a* and the second flexible element 2*b* are displaced upon interaction from the first cover elements 2*a* and the second cover elements 2*b* when displaced between the open position $P_O$ and the closed position $P_C$.

As shown in FIGS. 5A-5C, the first flexible element 6*a* is extending in the lateral direction $D_{LA}$ from the first lateral side $S_{L1}$ towards the second lateral side $S_{L2}$. The second flexible element 6*b* is extending in the lateral direction $D_{LA}$ from the second lateral side $S_{L2}$ towards the first lateral side $S_{L1}$. The first flexible element 6*a* and the second flexible element 6*b* are in this embodiment arranged in a non-overlapping relationship in the lateral direction $D_{LA}$, and with this configuration, the longitudinal opening $O_L$ is provided between the first flexible element 6*a* and the second flexible element 6*b*. Upon movement of the upper rail structure 3 relative to the seat rail R in the longitudinal direction $D_{LO}$, the first cover elements 2*a* and the second cover elements 2*b* are pivoted away from the seat rail R upon displacement from the closed position $P_C$ to the open position $P_O$, as described above. This pivoting movement is deflecting the respective first flexible element 6*a* and second flexible element 6*b* upwards from the flat position. Upon movement of the upper rail structure 3 relative to the seat rail R in the longitudinal direction $D_{LO}$, the first cover elements 2*a* and the second cover elements 2*b* are pivoted towards the seat rail R upon displacement from the open position $P_O$ to the closed position $P_C$. This pivoting movement is deflecting the respective first flexible element 6*a* and second flexible element 6*b* back to its flat position. It should be understood that in other non-illustrated embodiments, the flexible elements could instead be arranged in an overlapping relationship.

The flexible elements are suitably made from a relatively soft flexible material, such as for example rubber or plastic, allowing them to be deformed when deflecting upon action from the cover elements.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Cover structure
2a: First cover element
2b: Second cover element
3: Upper rail structure
3a: Front end
3b: Rear end
4a: First groove
4b: Second groove
4c: Third groove
5a: First protruding element
5b: Second protruding element
5c: Third protruding element
6a: First flexible element
6b: Second flexible element
7: Inclining surface
7a: Evacuation hole
8a: First outer cover structure
8b: Second outer cover structure
9a: First inclined surface
9b: Second inclined surface
10a: First closing element
10b: Second closing element
11a: First shaft structure
11b: Second shaft structure
$A_{P1}$: First pivoting axis
$A_{P2}$: Second pivoting axis
$D_{LA}$: Lateral direction
$D_{LO}$: Longitudinal direction
$D_V$: Vertical direction
F: Floor structure
$F_C$: Closing force
$F_O$: Opening force
$F_{RS}$: Recessed section
$F_{US}$: Upper surface
$O_L$: Longitudinal opening
$P_C$: Closed position
$P_I$: Intermediate position
$P_O$: Open position
$P_{OC}$: Over-centre position
R: Seat rail
S: Vehicle seat rail sealing system
$S_{L1}$: First lateral side
$S_{L2}$: Second lateral side
$S_{LI}$: Inner lateral side
$S_{LO}$: Outer lateral side $S_O$: Outer side
$S_U$: Upper side
V: Vehicle
$V_S$: Vehicle seat

What is claimed is:

1. A vehicle seat rail sealing system comprising a cover structure arranged in connection to an upper side of a seat rail, wherein the seat rail is having an elongated configuration with an extension in a longitudinal direction, wherein the cover structure comprises a plurality of first cover elements arranged in connection to each other in the longitudinal direction and a plurality of second cover elements arranged in connection to each other in the longitudinal direction, wherein the first cover elements and corresponding second cover elements are pairwise arranged on opposite lateral sides of the seat rail and configured for cooperating with each other, wherein the first cover elements via an outer lateral side are configured for pivoting around a first pivoting axis extending in the longitudinal direction and arranged on a first lateral side of the seat rail, wherein the second cover elements via an outer lateral side are configured for pivoting around a second pivoting axis extending in the longitudinal direction and arranged on a second lateral side of the seat rail, wherein an inner lateral side of the first cover elements are releasably connectable to an inner lateral side of the corresponding second cover elements, wherein the inner lateral sides are positioned above the seat rail, wherein in an open position the inner lateral side of the first cover elements are disconnected from the inner lateral side of the corresponding second cover elements, and wherein in a closed position the inner lateral side of the first cover elements are connected to the inner lateral side of the corresponding second cover elements in an over-centre position.

2. The vehicle seat rail sealing system according to claim 1, wherein the system further comprises a movably arranged upper rail structure configured for being slidingly connected to the seat rail, wherein upon movement of the upper rail structure along the seat rail in the longitudinal direction the upper rail structure is configured for displacing the first cover elements and the second cover elements between the open position and the closed position.

3. The vehicle seat rail sealing system according to claim 2, wherein the upper rail structure is configured for arranging the first cover elements and the second cover elements corresponding to a longitudinal position of the upper rail structure in the open position through interaction by a front end or a rear end of the upper rail structure.

4. The vehicle seat rail sealing system according to claim 1, wherein the first cover elements and the second cover elements are configured for pivoting in a direction away from the seat rail upon displacement from the closed position to the open position, and wherein the first cover elements and the second cover elements are configured for pivoting in a direction towards the seat rail upon displacement from the open position to the closed position.

5. The vehicle seat rail sealing system according to claim 1, wherein in the closed position the first cover elements are configured for cooperating with the corresponding second cover elements in an overlapping relationship in the lateral direction.

6. The vehicle seat rail sealing system according to claim 5, wherein the first cover elements comprises a first groove and a first protruding element, wherein the second cover elements comprises a second groove and a second protruding element, wherein in the overlapping relationship in the lateral direction, the first protruding element is in engagement with the second groove and the second protruding element is in engagement with the first groove.

7. The vehicle seat rail sealing system according to claim 6, wherein the first cover elements comprises a third protruding element and the second cover elements comprises a third groove, wherein in the overlapping relationship in the lateral direction, the third protruding element is in engagement with the third groove.

8. The vehicle seat rail sealing system according to claim 1, wherein one or more of the first cover elements and/or the second cover elements are arranged with a downwards inclining surface comprising an evacuation hole.

9. The vehicle seat rail sealing system according to claim 1, wherein the system further comprises a first flexible element arranged in connection to an outer side of the first cover elements and a second flexible element arranged in connection to an outer side of the second cover elements, wherein the first flexible element is extending in the longitudinal direction above the first cover elements for forming a first outer cover structure, wherein the second flexible element is extending in the longitudinal direction above the second cover elements for forming a second outer cover structure, wherein a longitudinal opening is provided between the first flexible element and the second flexible element.

10. The vehicle seat rail sealing system according to claim 9, wherein the first flexible element is extending in the lateral direction from the first lateral side towards the second lateral side, wherein the second flexible element is extending in the lateral direction from the second lateral side towards the first lateral side.

11. The vehicle seat rail sealing system according to claim 10, wherein the first flexible element and the second flexible element are arranged in a non-overlapping relationship in the lateral direction.

12. A vehicle comprising a vehicle seat rail sealing system according to claim 1.

13. A method for operating a vehicle seat rail sealing system comprising a cover structure arranged in connection to an upper side of a seat rail, wherein the seat rail is having an elongated configuration with an extension in a longitudinal direction, wherein the cover structure comprises a plurality of first cover elements arranged in connection to each other in the longitudinal direction and a plurality of second cover elements arranged in connection to each other in the longitudinal direction, wherein the first cover elements and corresponding second cover elements are pairwise arranged on opposite lateral sides of the seat rail and configured for cooperating with each other, wherein the first cover elements via an outer lateral side are arranged to pivot around a first pivoting axis extending in the longitudinal direction and arranged on a first lateral side of the seat rail, wherein the second cover elements via an outer lateral side are arranged to pivot around a second pivoting axis extending in the longitudinal direction and arranged on a second lateral side of the seat rail, wherein an inner lateral side of the first cover elements are releasably connectable to an inner lateral side of the corresponding second cover elements, wherein the inner lateral sides are positioned above the seat rail, wherein the method comprises the steps:

disconnecting the inner lateral side of the first cover elements from the inner lateral side of the corresponding second cover elements in an open position; and connecting the inner lateral side of the first cover elements to the inner lateral side of the corresponding second cover elements in an over-centre position in a closed position.

14. The method according to claim 13, wherein the system further comprises a movably arranged upper rail structure configured for being slidingly connected to the seat rail, wherein the method further comprises the step: displacing the first cover elements and the second cover elements between the open position and the closed position by the upper rail structure upon movement of the upper rail structure along the seat rail in the longitudinal direction.

15. The method according to claim 13, wherein the method further comprises the steps: pivoting the first cover elements and the second cover elements in a direction away from the seat rail upon displacement from the closed position to the open position; and pivoting the first cover elements and the second cover elements in a direction towards the seat rail upon displacement from the open position to the closed position.

16. The method according to claim 13, wherein the system further comprises a first flexible element arranged in connection to an outer side of the first cover elements and a second flexible element arranged in connection to an outer side of the second cover elements, wherein the first flexible element is extending in the longitudinal direction above the first cover elements for forming a first outer cover structure, wherein the second flexible element is extending in the longitudinal direction above the second cover elements for forming a second outer cover structure, wherein a longitudinal opening is provided between the first flexible element and the second flexible element, wherein the method further comprises the step: displacing the first flexible element and the second flexible element upon interaction from the first cover elements and the second cover elements when displaced between the open position and the closed position.

* * * * *